United States Patent
Segel (10) Patent No.: US 9,538,141 B2
(45) Date of Patent: Jan. 3, 2017

(54) METHOD AND APPARATUS FOR CONTROLLING PRESENTATION OF CONTENT AT A USER TERMINAL

(75) Inventor: Jonathan Segel, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 1659 days.

(21) Appl. No.: 11/967,432

(22) Filed: Dec. 31, 2007

(65) Prior Publication Data

US 2009/0172552 A1    Jul. 2, 2009

(51) Int. Cl.
*G06F 3/048*    (2013.01)
*H04N 7/173*    (2011.01)
(Continued)

(52) U.S. Cl.
CPC ...... *H04N 7/17318* (2013.01); *H04N 5/44543* (2013.01); *H04N 21/4331* (2013.01);
(Continued)

(58) Field of Classification Search
CPC ............ H04N 5/44543; H04N 7/17318; H04N 21/4825; H04N 21/4334; H04N 21/4622; H04N 21/4331
(Continued)

(56) References Cited

U.S. PATENT DOCUMENTS 7,584,214 B2 *   9/2009   Narahara et al.
7,861,268 B2 *  12/2010   Kwak .............................. 725/47
(Continued)

FOREIGN PATENT DOCUMENTS

GB    2 385 683 A    8/2003
JP    2005-051562 A  2/2005
(Continued)

OTHER PUBLICATIONS

International Search Report and Written Opinion mailed Jul. 16, 2009 in PCT/IB2008/055689, Alcatel Lucent Applicant, 13 pages.
(Continued)

*Primary Examiner* — Anil Bhargava
(74) *Attorney, Agent, or Firm* — Tong, Rea, Bentley & Kim, LLC (57) ABSTRACT

The invention controls presentation of content at an end user terminal to allow an end user to consume any kind of content without specifying anything about how the content is delivered. A method includes creating a content schedule, determining content presentation control information using the content schedule, and using the content presentation control information to control the presentation of content on one or more end user terminals. The content schedule, which identifies a plurality of content items intended for the end user terminal, includes at least one content characteristic associated with each of the content items. The content presentation control information is adapted for controlling presentation of the content items at the end user terminal in a manner tending to render the content characteristics transparent to the end user. The content items may be distributed using different content distribution modes, which include at least one time-dependent distribution mode and at least one time-independent distribution mode. The content presentation control information controls the presentation of content at the end user terminal.

22 Claims, 6 Drawing Sheets

(51) Int. Cl.
*H04N 5/445* (2011.01)
*H04N 21/433* (2011.01)
*H04N 21/462* (2011.01)
*H04N 21/482* (2011.01)

(52) U.S. Cl.
CPC ..... *H04N 21/4334* (2013.01); *H04N 21/4622* (2013.01); *H04N 21/4825* (2013.01)

(58) Field of Classification Search
USPC ...... 715/716, 719, 720, 721; 725/39, 46, 47, 725/56
See application file for complete search history.

(56) References Cited

U.S. PATENT DOCUMENTS

| | | | |
|---|---|---|---|
| 8,001,471 B2* | 8/2011 | Shaver et al. | 715/716 |
| 8,006,262 B2* | 8/2011 | Rodriguez et al. | 725/37 |
| 8,015,491 B2* | 9/2011 | Shaver et al. | 715/719 |
| 8,201,202 B2* | 6/2012 | Ota | 725/46 |
| 8,272,015 B2* | 9/2012 | Schwesinger et al. | 725/58 |
| 2002/0038456 A1* | 3/2002 | Hansen et al. | 725/46 |
| 2002/0156911 A1 | 10/2002 | Croman et al. | |
| 2003/0002862 A1* | 1/2003 | Rodriguez et al. | 386/125 |
| 2003/0061040 A1 | 3/2003 | Likhachev et al. | |
| 2003/0061611 A1* | 3/2003 | Pendakur | 725/46 |
| 2003/0115278 A1 | 6/2003 | Goker | |
| 2003/0130887 A1 | 7/2003 | Nathaniel | |
| 2003/0227478 A1* | 12/2003 | Chatfield | 345/751 |
| 2005/0010653 A1 | 1/2005 | McCanne | |
| 2005/0076104 A1 | 4/2005 | Liskov | |
| 2005/0108356 A1 | 5/2005 | Rosu | |
| 2005/0120373 A1* | 6/2005 | Thomas et al. | 725/58 |
| 2005/0160458 A1* | 7/2005 | Baumgartner | 725/46 |
| 2006/0010467 A1* | 1/2006 | Segel | 725/34 |
| 2006/0149854 A1 | 7/2006 | Rudkin et al. | |
| 2006/0195557 A1 | 8/2006 | Dew et al. | |
| 2006/0209694 A1* | 9/2006 | Chandhok et al. | 370/235 |
| 2007/0033634 A1* | 2/2007 | Leurs et al. | 725/143 |
| 2007/0073834 A1* | 3/2007 | Charlebois et al. | 709/217 |
| 2007/0124769 A1* | 5/2007 | Casey et al. | 725/46 |
| 2007/0130585 A1* | 6/2007 | Perret et al. | 725/46 |
| 2007/0199019 A1* | 8/2007 | Angiolillo et al. | 725/39 |
| 2007/0204057 A1* | 8/2007 | Shaver et al. | 709/231 |
| 2007/0234102 A1 | 10/2007 | Fan et al. | |
| 2007/0276821 A1* | 11/2007 | Aravamudan et al. | 707/5 |
| 2008/0090513 A1* | 4/2008 | Collins et al. | 455/3.01 |
| 2008/0155623 A1* | 6/2008 | Ota | 725/109 |
| 2008/0177861 A1 | 7/2008 | Basani et al. | |
| 2008/0273591 A1 | 11/2008 | Brooks et al. | |
| 2008/0301736 A1* | 12/2008 | Heilbron et al. | 725/61 |
| 2008/0320516 A1* | 12/2008 | Yee et al. | 725/44 |
| 2009/0049185 A1 | 2/2009 | Hudson | |
| 2009/0049471 A1* | 2/2009 | Kamiya | 725/39 |
| 2009/0055506 A1 | 2/2009 | Hudson | |
| 2009/0055547 A1 | 2/2009 | Hudson | |
| 2009/0106797 A1* | 4/2009 | Lucente | 725/46 |
| 2009/0106802 A1 | 4/2009 | Zuckerman et al. | |
| 2009/0113512 A1* | 4/2009 | Collet et al. | 725/132 |
| 2009/0119715 A1* | 5/2009 | Schwesinger et al. | 725/58 |
| 2009/0133079 A1 | 5/2009 | Li et al. | |
| 2009/0138907 A1* | 5/2009 | Wiser et al. | 725/34 |
| 2009/0157899 A1 | 6/2009 | Gagliardi et al. | |
| 2009/0165057 A1* | 6/2009 | Miller et al. | 725/68 |
| 2009/0210549 A1 | 8/2009 | Hudson | |
| 2010/0250674 A1 | 9/2010 | Terao et al. | |
| 2011/0214148 A1* | 9/2011 | Gossweiler et al. | 725/46 |

FOREIGN PATENT DOCUMENTS

| | | |
|---|---|---|
| JP | 2007-324897 A | 12/2007 |
| WO | WO 02/23363 A | 3/2002 |
| WO | WO 2007/068290 A | 6/2007 |

OTHER PUBLICATIONS

May 8, 2012 Office Action in JP Patent Application No. 2010-540213, Alcatel-Lucent, Applicant, 2 pages.
Translation of Chinese Office Action for Chinese Patent Application No. 200880123239.0, dispatched Aug. 28, 2013.

* cited by examiner

METHOD AND APPARATUS FOR CONTROLLING PRESENTATION OF CONTENT AT A USER TERMINAL

FIELD OF THE INVENTION

The invention relates to the field of communication networks and, more specifically, to controlling presentation of content at a user terminal.

BACKGROUND OF THE INVENTION

As the volume of content that is consumed in a personalized fashion continues to grow, existing mechanisms for delivering content are not always able to efficiently deliver the personalized content to users. Furthermore, the presentation of the content to end users is often disorganized, resulting in a dissatisfying viewing experience for the end user. Typically, there is one type of user interface for broadcast content which is organized into channels, with a particular content item on a given channel in a particular time slot. If a storage mechanism such as a Personal Video recorder exists to save certain content from the broadcast network for replaying later, this will have a different interface. There is yet a different interface for accessing unicast content, which is typically stored content, such as video on demand. Non-stored unicast streams, such as a real-time webcam will typically have yet another interface.

Today, if a user wants to access content of different types through different types of networks, the user must take on the task of organizing what content item will be viewed when, and the user must navigate between different interfaces to find and access that content. This is frequently a task of considerable complexity, involving search for broadcast content items within a large electronic program guide or on-demand items in a large library of content, choice of a set of content items to be viewed within an available viewing period, and controlling devices to view or otherwise consume the content. If the same content item can potentially be sourced in multiple ways, or is to be consumed on multiple devices, the complexity is further increased. There is currently no automated mechanism for organizing content for presentation to an end user which makes accessing that content simple and convenient for the end user.

SUMMARY OF THE INVENTION

Various deficiencies in the prior art are addressed through the present invention for controlling presentation of content at an end user terminal. A method according to one embodiment of the present invention includes generating a content schedule, determining content presentation control information using the content schedule, and using the content presentation control information to control the presentation of content on one or more end user terminals.

The content schedule identifies a plurality of content items intended for the end user terminal, and includes at least one content characteristic associated with each of the content items. For example, the at least one content characteristic for a content item may specify information such as a preferred network mode to obtain that content item (e.g., broadcast, multicast, or unicast), timing associated with obtaining that content item (e.g., real-time, stored, or other types of timing) and the like, as well as various combinations thereof.

The content presentation control information is translation of a content schedule into a sequence of commands adapted to control presentation of content to the end user. For example, the content presentation control information may control actions such as receiving, storing, and presenting content items in the content schedule, as well as any other actions which may be performed at the end user terminal in order to present the content items in the content schedule. The content items are presented such that the means by which and manner in which presentation of the content items was organized is transparent to the end user.

The content items may be distributed to the end user terminal using different content distribution modes, which may include at least one time-dependent distribution mode and at least one time-independent distribution mode. The content presentation control information controls the content at the end user terminal to maximize the ease with which an end user may access scheduled content, thereby allowing, for example, a personalized content channel for the end user.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides a seamless content viewing schedule and experience for an end user, where the content may be delivered using multiple content distribution modes and may include both content that is fixed in time (time-dependent) and content not fixed in time (time-independent). As an example, time-dependent content may include real-time broadcast of a news program, real-time broadcast of a sports event, and the like. As an example, time-independent content may include an on-demand movie stored on a server, a weather clip available from a server, and the like.

The present invention dynamically schedules presentation of content for an end user such that characteristics of the content (e.g., the source of the content, the mode of distribution of the content, time parameters associated with the content, including whether it is time-dependent or time-independent, and the like) are transparent to the end user.

The end user, or a software agent acting on behalf of the end user, requests content and the requested content is presented to the end user.

Figure 1:
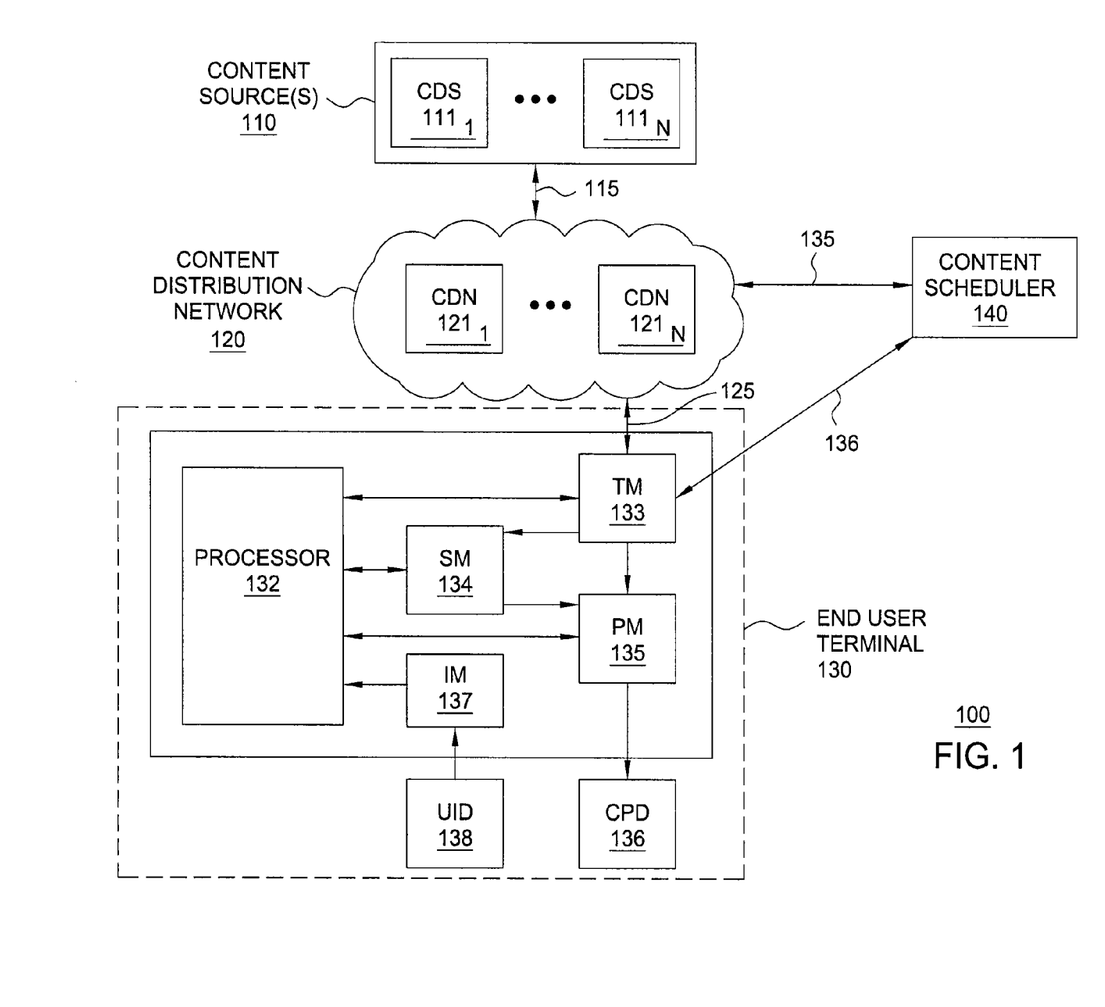
FIG. 1 depicts a high-level block diagram of a communication network architecture.

FIG. 1 depicts a high-level block diagram of a communication network architecture. Specifically, communication network architecture 100 includes a content source (CS) 110, a content distribution network (CDN) 120, an end user terminal (EUT) 130, and a content scheduler (CS) 140. The CS 110 is coupled to CDN 120 via a communication path 115. The EUT 130 is coupled to CDN 120 via a communication path 125. The CS 110 distributes content to EUT 130 via CDN 120. The CS 140 determines a content schedule for EUT 130. The CS 140 provides the content schedule to EUT 130 for use by EUT 130 in scheduling presentation of content at EUT 130. The CS 140 is coupled to CDN 120 via a communication path 135 (and may also be coupled to EUT 130 via another communication path 145 (e.g., using a communication path not traversing CDN 120)).

The CS 110 provides content for EUT 130. The CS 110 may provide any type of content (e.g., stored content and/or live/real-time content) to EUT 130. The CS 110 includes a plurality of content distribution servers (CDSs) $111_1$-$111_N$ (collectively, CDSs 111). The CDSs 111 distribute content to EUT 130. The CDSs 111 may also distribute content to network-based nodes capable of storing content for eventual distribution to EUT 130 (e.g., to one or more of network elements of CDN 120). For example, CDSs 111 may include broadcast servers, switched broadcast servers, multicast servers, unicast servers, and the like, or any other network element(s) capable of distributing content to EUT 130. The CDSs 111 distribute content to EUT 130 using CDN 120.

The content distributed from CS 110 to content destination nodes may be any content capable of being delivered over a communication network. The content delivered from CS 110 to EUT 130 may include one or more content items, where a content item includes content for which distribution and presentation may be scheduled independent of other content available at CS 110. For example, a content item may include a data file, a group of data files, a webpage, an audio clip, a collection of audio clips, a song, an album of songs, a video clip, a collection of video clips, a multimedia clip, a collection of multimedia clips, a live television program, a live movie, an on-demand television program, an on-demand movie, and the like, as well as various combinations thereof. The content items may include any other forms of content.

The CDN 120 facilitates distribution of content from CS 110 to EUT 130 and, optionally, to network elements serving EUT 130 (e.g., network-based nodes, such as local network caching nodes, access network caching nodes, core network caching nodes, and the like, as well as various combinations thereof). The CDN 120 supports multiple content distribution modes. For example, CDN 120 supports content distribution modes such as a broadcast mode, a switched broadcast mode, a multicast mode, a unicast mode, and the like, as well as various combinations thereof. The CDN 120 includes a plurality of content distribution nodes (CDNs) $121_1$-$121_N$ (collectively, CDNs 121) which facilitate distribution of content from CS 110 to EUT 130 using the different content distribution modes.

The CDNs 121 may include any network elements for facilitating distribution of content from CS 110 to EUT 130. The CDNs 121 may vary for different content distribution modes. For example, CDNs 121 may include broadcast nodes supporting content broadcast and/or switched broadcast capabilities (e.g., broadcast replication elements for replicating broadcast content, switches, routers, servers, caching nodes, and the like), multicast nodes supporting content multicast capabilities (e.g., multicast replication elements for replicating multicast content, switches, routers, servers, caching nodes, and the like), unicast nodes supporting content unicast capabilities (e.g., routers, switches, caching nodes, and the like), and the like, as well as various combinations thereof.

The CDN 120 is depicted herein as one communication network (i.e., for purposes of clarity, the specific content distribution networks have not been depicted); however, as described herein, CDN 120 may include one or more of a broadcast network, a switched broadcast network, a multicast network, a unicast network, and the like, as well as various combinations thereof. The broadcast, switched broadcast, multicast, and unicast networks may be implemented as one or more distinct networks. In one embodiment, for example, broadcast and switched broadcast capabilities may be provided by a broadcast network while multicast and unicast capabilities may be provided by a multicast/unicast network. In another embodiment, for example, broadcast and switched broadcast capabilities may be provided by a broadcast network, multicast capabilities may be provided by a multicast network, and unicast capabilities may be provided by a unicast network.

In other words, different content distribution modes may be supported using different numbers and/or combinations of content distribution networks, as well as different levels of interaction between such networks (e.g., from isolated networks to fully integrated networks).

For example, content broadcast capabilities may be provided by one or more wired broadcast networks (e.g., an HFC-based broadcast network, an IP-based broadcast network, and the like), wireless broadcast networks (e.g., a Media-Forward Link Only (MediaFLO) wireless network, a Digital Video Broadcasting-Handheld (DVB-H) wireless network, a Digital Multimedia Broadcasting (DMB) wireless network, a satellite network, and the like), and the like, as well as various combinations thereof.

For example, content multicast capabilities and/or unicast capabilities may be provided by one or more of wired multicast/unicast networks (e.g., IP networks and the like), wireless multicast/unicast networks (e.g., a General Packet Radio Service (GPRS) wireless network, a Universal Mobile Telecommunications System (UMTS) wireless network, a Code Division Multiple Access (CDMA) 2000 (CDMA2000)-based Evolution Data Optimized (EvDO) wireless network, and the like), and the like, as well as various combinations thereof.

The content distribution modes may be provided using various other types of communications networks.

The EUT 130 is an end user terminal capable of receiving and presenting content. The EUT 130 receives content via CDN 120. The EUT 130 presents content according to a content schedule generated by CS 140. The EUT 130 includes one or more presentation interfaces by which received content is presented to the end user. The EUT 130 includes one or more end user interaction interface by which an end user may request content, as well as interact with presented content. For example, EUT 130 may include a home media server, a television system (e.g., the set top box, television, and the like), a desktop computer, a laptop computer, a mobile phone, a PDA, and the like, as well as various combinations thereof.

As depicted in FIG. 1, EUT 130 includes a content control client (CCC) 131, at least one content presentation device (CPD) 136, and at least one user interaction device (UID) 138. The CCC 131 includes a transceiver module (TM) 133, a storage module (SM) 134, a presentation module (PM) 135, and an input module (IM) 137. The CCC 131 also includes a processor 132, which controls the operation of TM 133, SM 134, PM 135, and IM 137. Although omitted for purposes of clarity, CCC 131 may include various other hardware and software adapted for providing the functions described herein.

The TM 133, SM 134, and PM 135 cooperate to present content to the end user via CPD 136. The TM 133 receives content distributed from CS 110 via CDN 120. The TM 133 may receive any type of content distributed using any content distribution mode. The TM 133 may provide received content to SM 134 or PM 135. The SM 134 stores the received content for later presentation to the end user (e.g., by retrieving the stored content and providing the stored content to PM 135). The PM 135 processes received content (e.g., real-time content received from TM 133 or stored content received from SM 134) to produce a content presentation stream. The PM 135 provides the content presentation stream to CPD 136, which presents the content to the end user.

Although primarily depicted and described herein with respect producing one content presentation stream for presentation to the end user using one content presentation device (illustratively, CPD 136), in other embodiments PM 135 may process received content to produce multiple content presentation streams which may be provided to one content presentation device, to multiple content presentation devices in parallel (e.g., contemporaneously), to multiple content presentation devices sequentially, and the like, as well as various combinations thereof. The multiple content presentation streams may include the same content or different content.

The IM 137 supports interaction by the end user via UID 138. The IM 137 receives input signals entered by the end user via UID 138. The IM 137 directs the input signals to processor 132. The processor 132 may process the input signals locally or may propagate the input signals toward the network (e.g., by providing the input signals to TM 133 for propagation via CDN 120 or any other network). For example, input signals for performing local controls (e.g., requesting a decrease or increase in the volume, requesting content stored locally in memory, and the like) are processed locally, and input signals requiring interaction with the network (e.g., requesting a different television channel, ordering a movie on-demand, and the like) are propagated toward the network via communication path 145.

As described herein, EUT 130 is an end user terminal capable of receiving and presenting content. The CPD 136 may be any content presentation device (or devices), which may vary for different EUTs 130. For example, CPD 136 may be a television, a computer monitor, a screen, a mobile phone, a PDA, speakers (or a stereo amplifier leading to speakers), and the like, as well as various combinations thereof. The UID 138 may be any input device (or devices), which may vary for different EUTs 130. For example, UID 138 may be a television remote control, a computer keyboard, a keypad, a mouse, a joystick, a trackball, a touchscreen, and the like, as well as various combinations thereof. The EUT 130 may include any other devices or other associated peripherals adapted for presenting content to the end user or enabling end user interaction, respectively.

The processor 132 controls the operation of TM 133, SM 134, and PM 135 in providing the content presentation functions of the present invention. In one embodiment, processor 132 receives the content schedule generated by CS 140 (e.g., via TM 133) and processes the content schedule to control the operation of EUT 130 in presenting content to the end user. The processor 132 may also control the processing and distribution (e.g., locally within EUT 131 or remotely to a network for upstream propagation) of user input signals received via UID 138. Although omitted for purposes of clarity, processor 132 may cooperate with hardware and software in order to provide such functions.

The CS 140 performs content scheduling functions of the present invention. The CS 140 dynamically schedules presentation of content at EUT 130 by generating information that defines which piece of content, delivered by which networking mode, should be presented to the end user at any given point in time. This information, which is referred to herein as a content schedule, is adapted for use by EUT 130 in controlling presentation of content to the end user. The CS 140 adapts the content schedule to produce messages that control the operation of CCC 131 to achieve the presentation of content to the end user. These control messages are referred to herein as content presentation control information. The operation of CS 140 in providing the content scheduling functions of the present invention may be better understood with respect to FIG. 2.

Although primarily depicted and described herein with respect to an embodiment in which CS 140 is implemented within the network (referred to herein as a network-based solution), in one embodiment CS 140 may be implemented as part of EUT 130 (referred to herein as a terminal-based solution). In one embodiment, CS 140 may be implemented using a combination of the network-based solution and the terminal-based solution (i.e., some portions of the functionality of CS 140 are implemented within the network while other portions of the functionality of CS 140 are implemented within EUT 130). The CS 140 may be implemented in various other ways for providing the content scheduling functions of the present invention.

Figure 2:
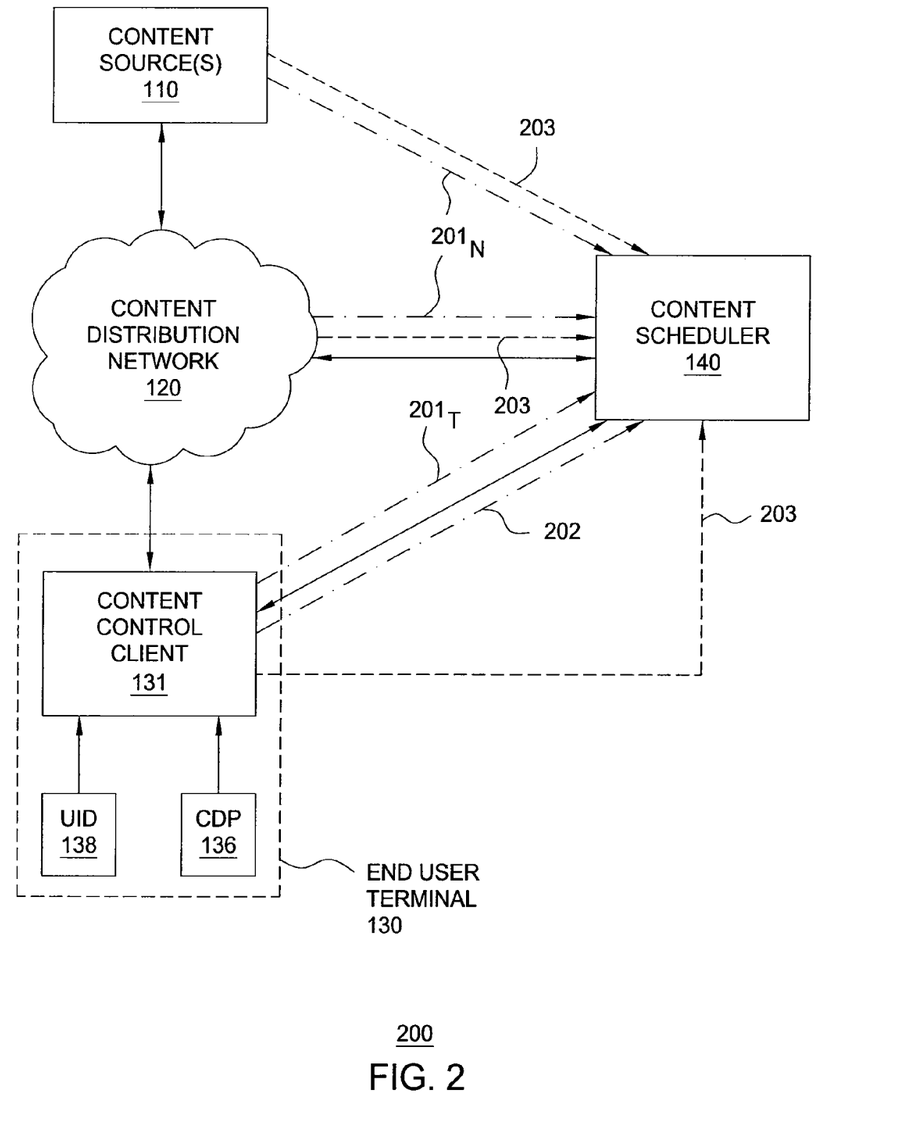
FIG. 2 depicts a high-level block diagram of the communication network architecture of FIG. 1 illustrating exchanges of information associated with generation and execution of a content schedule.

FIG. 2 depicts a high-level block diagram of the communication network architecture of FIG. 1 illustrating exchanges of information associated with dynamically scheduling presentation of content. The CS 140 dynamically schedules presentation of content at EUT 130 using content presentation control information. The CS 140 generates content presentation control information using a content schedule. The CS 140 generates the content schedule. The content schedule may be generated using information received from the network (denoted as $201_N$), information received from the end user terminal (denoted as $201_T$), and the like, as well as various combinations thereof. Thus, the content presentation control information (denoted as 202) is generated using the information (denoted collectively as information 201) which is used to generate the content schedule.

The information $201_N$ received from the network may include information indicating which content items have already been provided to EUT 130, which content items are currently being provided to EUT 130, which content items are scheduled to be provided to EUT 130, and the like, as well as various combinations thereof, and may include any other information which may be used to generate the content schedule.

The information $201_T$ received from EUT 130 may include information identifying the content items that are requested by the end user via EUT 130. The information $201_T$ may also include content items that are selected by the network for distribution to EUT 130 (e.g., by predictive intelligence nodes operating within the network, as described herein with respect to CDN 120).

The information $201_T$ received from the end user terminal may further include information indicating which content items are currently stored on EUT 130, information indicative of the capabilities and/or state of EUT 130 (e.g., current storage space available on EUT 130, presentation capabilities of CPD 136, and the like, as well as various combinations thereof). The information $201_T$ received from the end user terminal may include any other information which may be used to generate the content schedule.

The information indicating which content items the end user would like to receive at EUT 130 may include end user preference information (e.g., based on trend information, based on information entered by the end user, and the like), information associated with end user requests (e.g., the end user schedules the set top box to switch to a certain channel at a certain time for a particular television program that the end user is interested in receiving, the end user programs the set top box to record all episodes of a particular television program, the end user orders an on-demand movie, and the like), and the like, as well as various combinations thereof. The information indicating which content items the end user would like to receive at EUT 130 may include various other types of information.

The content schedule may include content characteristic information for each content item.

The content characteristic information for a content item may identify the source of the content item. In one embodiment, the source of the content item may identify the original source of the content item (e.g., the content item was sourced from a television broadcast source, a web server, and the like). In one embodiment, the source of the content item may identify the current source of the content item (e.g., whether the content item is currently available on the end user terminal, whether the content item must be received from the network, and the like). The source information associated with a content item may include other information.

The content characteristic information for a content item may identify a distribution mode (or modes) by which the content item was provide or by which the content item is available (depending on whether or not the content item has already been provided to the end user terminal). As one example, a television program may be available via broadcast distribution at the time at which the television program originally airs, and may be available on-demand thereafter via a multicast distribution or unicast distribution. It may also be available via broadcast distribution on different channels and in different time slots. As another example, an on-demand movie may be available for distribution by multicast distribution or unicast distribution. The distribution mode information associated with a content item may include other information.

The content characteristic information for a content item may identify at least one time characteristic of the content item. For example, the at least one time characteristic of a content item may include an indication as to whether the content item is fixed in time or not fixed in time. For example, the at least one time characteristic of a content item may include one or more of a time at which the content item becomes available, a time until which the content item will remain available, a start time of the content item, a stop time of the content item, a duration of the content item, and the like, as well as various combinations thereof. The time characteristic information associated with a content item may include other information.

The content characteristic information for a content item may include information about the actual content of the content item.

For example, content characteristic information may identify the type of content of the content item (e.g., sports program, comedy program, dramatic movie, and the like). This information may be used in many ways. For example, certain types of content may be scheduled before other types of content where possible (e.g., scheduling live events, such as a sporting event, before non-live events such that the end user does not learn the outcome of the live event before having a chance to watch it). For example, certain types of content may be scheduled before other types of content where possible (e.g., scheduling presentation of content based on user preferences for different types of content, e.g., where the end user prefers action/adventure movies and financial advice programs over other types of content).

For example, content characteristic information may identify the level of quality of the content of the content item (e.g., high definition television programming, standard definition television programming, low-quality audio clip, and the like). This information may be used in many ways. For example, higher quality content may be scheduled before lower quality content where possible (e.g., if the end user prefers high quality content and their end device CDP 136 supports higher quality). For example, the level of quality of the content may be used in determining an amount of storage space required at the end user terminal in order to store that content item, which may in turn affect whether the content item is scheduled to be presented as it is received (to eliminate the need to store the content item) or is scheduled to be stored as it is received (for later retrieval and presentation to the end user). The level of quality of the content of the content item may be used in many other ways.

Information about the content item may also be used in many other ways.

The content characteristic information may be obtained from a variety of sources. For example, content characteristic information may be obtained from the network and/or the end user terminal. For example, content characteristic may be obtained from requests from the end user terminal, electronic program guide (EPG) information available in broadcast networks, content metadata associated with stored content, content availability information available from multicast and/or unicast networks (e.g., schedules of content availability), and the like, as well as various combinations thereof. Thus, the present invention is not intended to be limited by the sources of such content characteristic information (i.e., any information that is available and may be received or otherwise obtained may be utilized to dynamically schedule presentation of content for an end user terminal).

As described herein, CS 140 may be implemented using a network-based and/or terminal based solution and, thus, the format in which information $201_N$ and $201_T$ is provided to CS 140 may vary depending on the implementation. For example, where CS 140 is implemented using a network-based solution, information $201_T$ from EUT 130 will be provided over one or more network connections. For example, where CS 140 is implemented using a terminal-based solution, information $201_T$ from EUT 130 will be provided locally at EUT 130 (e.g., using signaling between different devices of EUT 130, using signaling within a device of EUT 130, and the like, as well as various combinations thereof).

The content presentation control information includes information adapted for controlling presentation of content at EUT 130.

For a content item, the content presentation control information may direct that the content item be presented at EUT 130 and/or that the content item be stored on EUT 130 (e.g., for presentation at EUT 130 at a later time). The content presentation control information may direct that other actions be performed for a content item or group of content items.

For a content item, the content presentation control information includes information adapted for use in controlling the content item. For example, the content presentation control information may include information such as the action to be taken for the content item (e.g., receive and present the content item; retrieve and present the content item; receive and store the content item; receive, store, and present the content item; and the like), the time(s) at which the content item is to be acted upon (e.g., start and/or stop times for receiving and/or storing the content item, start and/or stop times for receiving/retrieving and presenting the content item, and the like), the source of the content item (e.g., remotely from the network or locally from storage on EUT 130), and the like, as well as various combinations thereof.

The content presentation control information may be represented in any manner.

In one embodiment, for example, the content presentation control information may be represented using one or more content presentation control commands. A content presentation control command may identify a content item for which action is to be taken (e.g., receive and store the content item, receive and present the content item, retrieve and present the content item, and the like), the action to be taken for that content item, the source of the content item for which action is to be taken (and, where appropriate, the distribution mode by which the content item is to be delivered), the time at which the action is to be taken for that content item (or one or more conditions that will trigger the action to be taken for the content item), and the like, as well as various combinations thereof.

The content presentation control information may be represented in other ways.

The CS 140 may provide the content presentation control information to EUT 140 using any type of signaling or messaging.

The CS 140 may provide the content presentation control information to EUT 130 in any manner. In one embodiment, for example, the content presentation control information may be provided to EUT 130 by providing content presentation control commands individually (e.g., as they become available, at or just prior to the time at which they are to be executed, or in any other manner), by providing groups of content presentation control commands (e.g., using batch command files, or by any other means of bulk transfer), by providing content presentation control commands as a list of actions which are triggered by conditions (e.g., such as a particular point in time, a request from the end user, or any other conditions), and the like, as well as various combinations thereof.

As described herein, CS 140 may be implemented using a network-based and/or terminal based solution and, thus, the format in which content presentation control information is provided to EUT 130, the manner in which content presentation control information is provided to EUT 130, and the like, may vary depending on the implementation. For example, where CS 140 is implemented using a network-based solution, content presentation control information will be provided over one or more network connections. For example, where CS 140 is implemented using a terminal-based solution, content presentation control information will be provided locally at EUT 130 (e.g., using signaling between different devices of EUT 130, using signaling within a device of EUT 130, and the like, as well as various combinations thereof).

As depicted in FIG. 2, in addition to user preference information $201_T$, CS 140 may also receive end user override requests (denoted as end user override requests 203). The CS 140 may receive end user override requests directly from EUT 130 or from the network (on behalf of EUT 130). An end user override request is any request received from an end user that contradicts a request previously received from, or on behalf of, the end user. The end user may initiate end user override requests using one or more user interfaces of EUT 130 (e.g., computer interfaces, television remote controls, and the like).

For example, end user override requests may include requests to continue watching a particular channel after the content item that the end user originally requested is complete (e.g., television program, on-demand movie, and the like), requests to stop watching a requested content item before the content item is complete, requests to pre-empt the planned sequence of presentation of content items, and the like, as well as various combinations thereof.

Figure 5A:
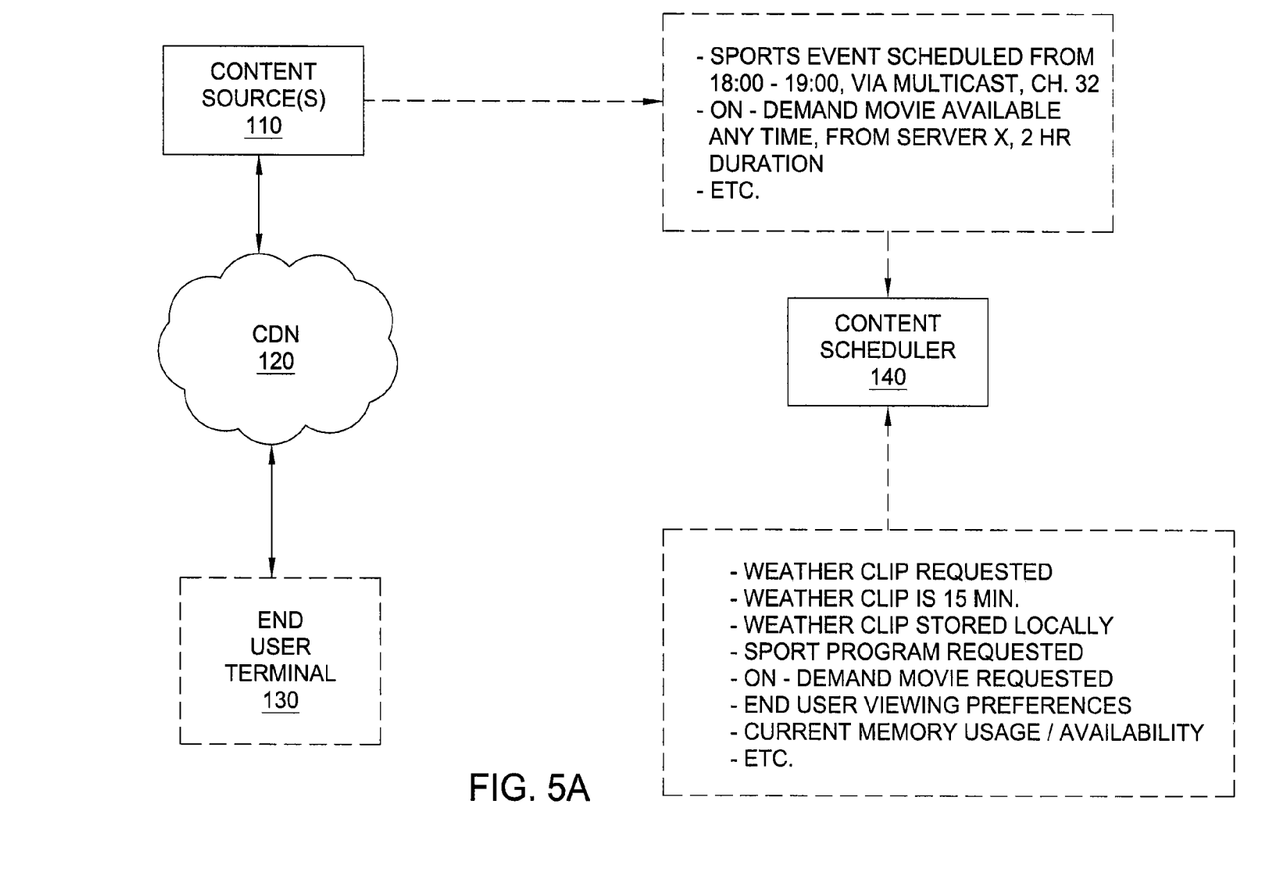
FIG. 5A depicts a high-level block diagram of the communication network architecture of FIG. 1 illustrating an example of the present invention.
Figure 5B:
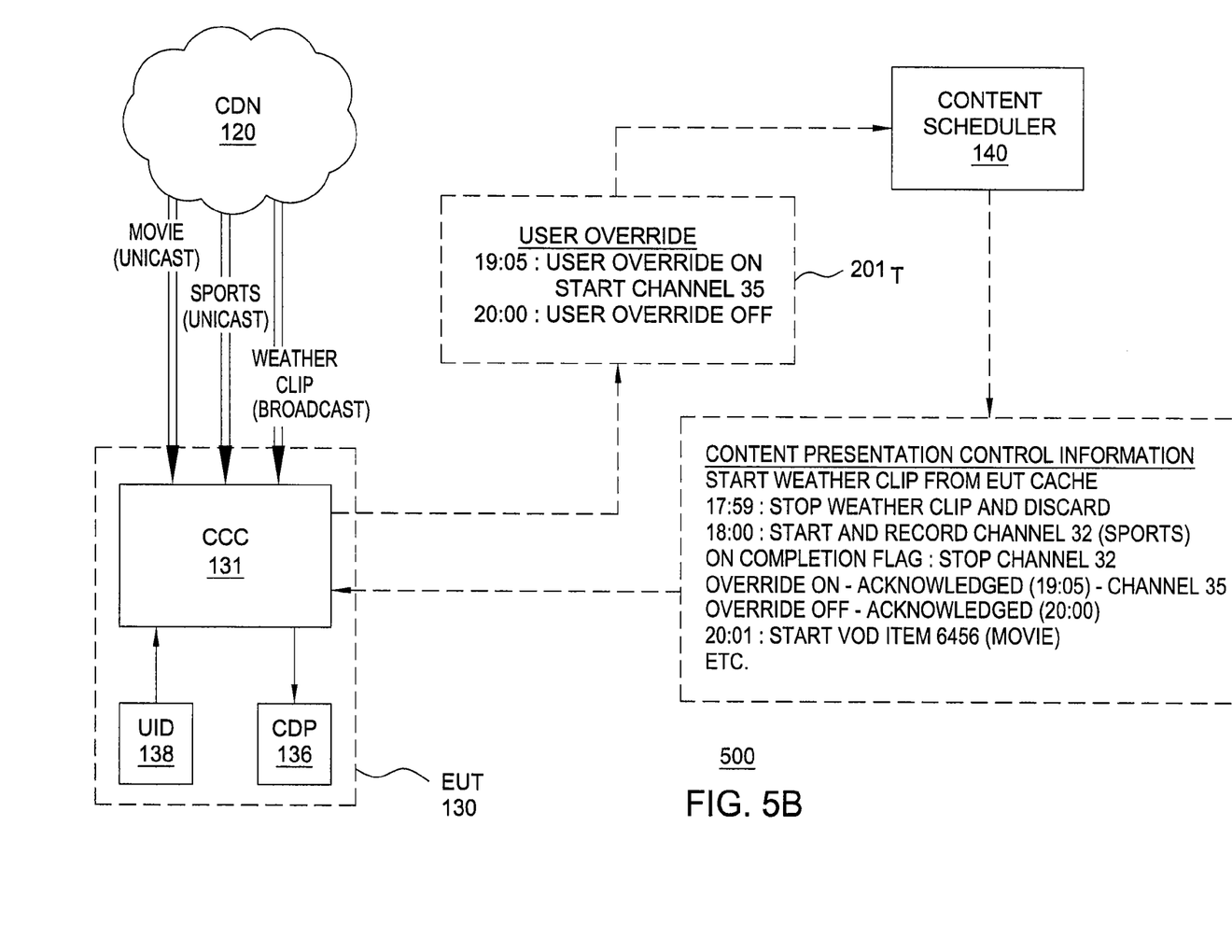
FIG. 5B depicts a high-level block diagram of the communication network architecture of FIG. 1 illustrating an example of the present invention.

The CS 140 determines content presentation control information based on the end user override requests, which may include generation of new network content presentation control information and/or modification of existing content presentation control information. In other words, end user override requests may be considered to be part of the information $201_T$ used by CS 140 to determine content presentation control information. The use of end user override requests to determine content presentation control information may be better understood with respect to FIG. 5.

Figure 3:
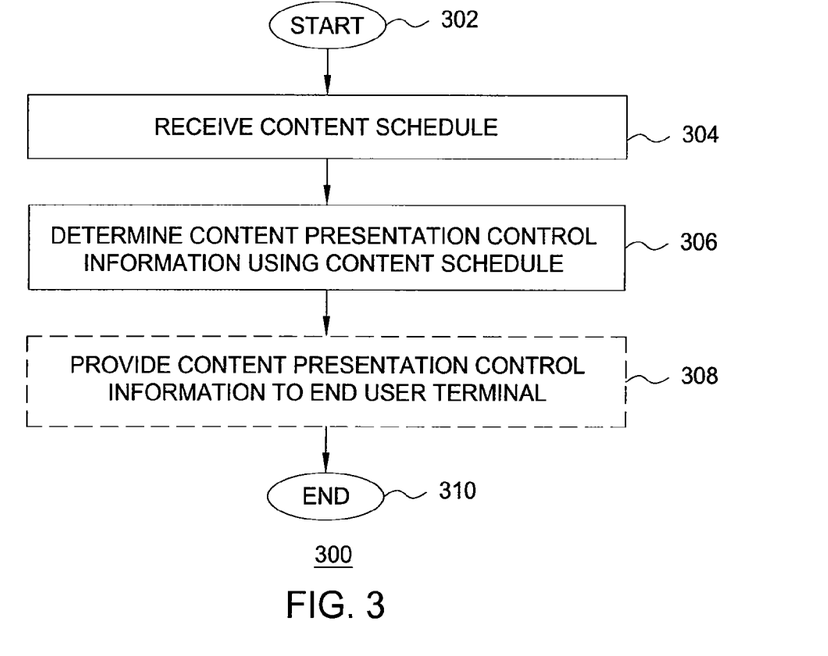
FIG. 3 depicts a method according to one embodiment of the present invention.

FIG. 3 depicts a method according to one embodiment of the present invention. Specifically, method 300 of FIG. 3 includes a method for determining content presentation control information adapted for use in controlling presentation of content at an end user terminal. Although depicted and described as being performed serially, at least a portion of the steps of method 300 of FIG. 3 may be performed contemporaneously, or in a different order than depicted and described with respect to FIG. 3. The method 300 begins at step 302 and proceeds to step 304.

At step 304, a content schedule is received. At step 306, content presentation control information is determined. The content presentation control information is determined using the content schedule. The details of the content schedule, and the details of the content presentation control information generated therefrom, may be better understood with respect to FIG. 2 and the example of FIG. 5.

At step 308 (an optional step depending on whether content presentation control information is determined at the end user terminal or within the network), the content presentation control information is provided to the end user terminal (if required). As described herein, where the content presentation control information is provided to the end user terminal, the content presentation control information may be provided to the end user terminal in many ways.

At step 310, method 300 ends. Although depicted and described as ending, it will be understood that each of the steps of method 300 continues to be performed as new content schedules become available (or end user override requests are received) and content presentation control information is determined (or modified) in accordance therewith. Thus, method 300 is depicted as ending merely for purposes of clarity.

Figure 4:
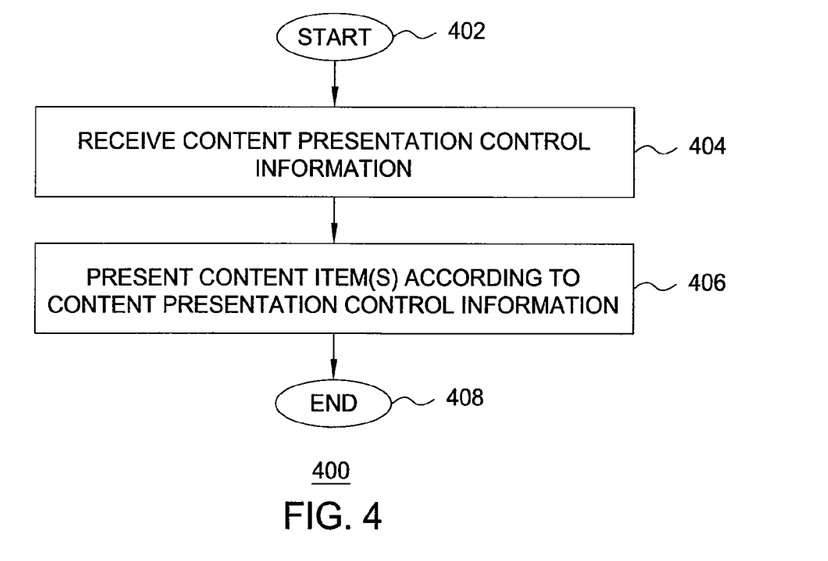
FIG. 4 depicts a method according to one embodiment of the present invention.

FIG. 4 depicts a method according to one embodiment of the present invention. Specifically, method 400 of FIG. 4 includes a method for controlling presentation of content at an end user terminal using content presentation control information. Although depicted and described as being performed serially, at least a portion of the steps of method 400 of FIG. 4 may be performed contemporaneously, or in a different order than depicted and described with respect to FIG. 4. The method 400 begins at step 402 and proceeds to step 404.

At step 404, content presentation control information is received. The contest presentation control information may be received locally (where the content scheduler is implemented at the end user terminal) or remotely via a network (where the content scheduler is implemented within the network).

At step 406, content items are presented according to the content presentation control information. The details of the content presentation control information, and use of the content presentation control information to control presentation of content at the end user terminal, may be better understood with respect to FIG. 2 and the example of FIG. 5.

At step 408, method 400 ends. Although depicted and described as ending, it will be understood that each of the steps of method 400 continues to be performed as updated content presentation control information is received and used to control presentation of content items at the end user terminal. Thus, method 400 is depicted as ending merely for purposes of clarity.

FIG. 5 depicts an example in which presentation of three content items at EUT 130 is controlled. In this example, the three content items include a weather clip (distributed via broadcast), a sports program (distributed via multicast), and an on-demand movie (distributed via unicast).

FIG. 5A depicts a high-level block diagram of the communication network architecture of FIG. 1 showing information received by CS 140 for use in generating a content schedule for EUT 130.

As depicted in FIG. 5A, CS 140 receives, or otherwise obtains, information associated with each of the three content items. The CS 140 learns that the weather clip is a 15 minute weather clip that was distributed by broadcast at 16:00 and which is currently stored on EUT 130. The CS 140 learns that the sports program is a live event scheduled to be transmitted via multicast, beginning at 18:00 and ending at 19:00. The CS 140 learns that the on-demand movie is a two hour movie which is available on-demand (stored on a network server) and which may be requested at any time via unicast. The CS 140 may receive other information associated with the three content items.

The CS 140 may also receive, or otherwise obtain, other information which may be used in generating the content schedule for EUT 130. For example, CS 140 may also receive, or otherwise obtain, information such as the current time, content viewing preferences of the end user, content viewing habits of the end user, information about EUT 130 (e.g., the current amount of memory available for storing content at EUT 130, the content presentation capabilities of EUT 130, and any other similar information), requests from the end user, and the like, as well as various combinations thereof. The CS 140 may receive, or otherwise obtain, any other information which may be used in determining the content schedule.

Although mainly depicted and described herein with respect to a content schedule being provided to CS 140 (e.g., initiated by the source(s) of such information), a content schedule may be retrieved by CS 140 (e.g., periodically, in response to other content schedules, and the like, as well as various combinations thereof). Additionally, although mainly depicted and described herein with respect to content schedules being received at CS 140 from specific sources, a content schedule may be received at CS 140 from any other source of such information. In other words, content schedules may be generated by CS 140 or received by CS 140 from any source(s) in any manner.

The CS 140 determines the content presentation control information for controlling presentation of the three content items at EUT 130. The CS 140 determines the content schedule using the received information $201_N$ and $201_T$. In this example, CS 140 determines that there is not enough time for the on-demand movie before the live sport event begins, but that there is enough time for the weather clip before the live sport event begins. Thus, CS 140 schedules the weather clip to be presented first (before the sport event starts). The CS 140 schedules the sport event to be presented second (beginning at 18:00 and ending at 19:00). The CS 140 schedules the movie to be presented third (beginning at 19:01 and ending at 21:01).

FIG. 5B depicts a high-level block diagram of the communication network architecture of FIG. 1 showing the content presentation control information provided from CS 140 to EUT 130.

As depicted in FIG. 5B, CS 140 provides the content presentation control information to EUT 130. The content presentation control information includes content presentation control information adapted for use by EUT 130 in controlling presentation of content at EUT 130 (e.g., sources of content, presentation times of content, and the like). The EUT 130 receives the content presentation control information and presents content at EUT 130 according to the content schedule. As described herein, CS 140 may provide the content presentation control information to EUT 130 in any manner (e.g., in any format, at any time(s), and the like). In this example, the content presentation control information includes commands adapted for use by EUT 130 in controlling presentation of content at EUT 130.

As depicted in FIG. 5B, the content presentation control information includes the following commands: START WEATHER CLIP FROM EUT CACHE; AT 17:59, STOP WEATHER CLIP AND DISCARD WEATHER CLIP; AT 18:00, START AND RECORD CHANNEL 32 (SPORT EVENT); ON COMPLETION FLAG, STOP CHANNEL 32. These commands specify information which EUT 130 can use to control presentation of content, e.g., the sources from which the content items are to be presented (whether it be local memory of EUT 130, from a channel being provided over a distribution network, and the like), the times at which the content items are to be presented, and the like, as well as various combinations thereof. The content presentation control information includes other commands, which are described below.

As further depicted in FIG. 5B, the end user of EUT 130 overrides the content presentation control information. Specifically, on completion of the sport event, the end user overrides the content schedule in order to continue watching multicast television until 20:00. The EUT 130 sends override commands to CS 140 to inform CS 140 of the user override. For example, to activate the override the EUT 130 may send a command of USER OVERRIDE ON (START CHANNEL 35) to CS 140 at 19:01 and to deactivate the override the EUT 130 may send a command of USER OVERRIDE OFF to CS 140 at 20:00.

As depicted in FIG. 5B, CS 140 adapts the content schedule according to the override commands received from EUT 130.

In this example, at 19:05, upon receiving the USER OVERRIDE ON command, CS 140 provides the following content presentation control command to EUT 130: OVERRIDE ON—ACKNOWLEDGED—19:05—CHANNEL 35. In an embodiment in which commands of the content presentation control information are provided from CS 140 to EUT 130 in advance (e.g., as they become available at CS 140), CS 140 sends the OVERRIDE ON—ACKNOWLEDGED (19:05)—CHANNEL 35 command to EUT 130 in order to override a command previously sent from CS 140 to EUT 130 directing EUT 130 to begin presenting the on-demand movie at 17:01. In an embodiment in which commands of the content presentation control information are provided from CS 10 to EUT 130 as needed, rather than sending a command to start the on-demand movie at 17:01, CS 140 instead sends the OVERRIDE ON—ACKNOWLEDGED (19:05)—CHANNEL 35 command, delaying the command that would have started the on-demand movie at 17:01.

In this example, at 20:00, upon receiving the USER OVERRIDE OFF command, CS 140 provides the following command to EUT 130: OVERRIDE OFF—ACKNOWLEDGED (20:00). If the end user provides an indication ahead of time that the override will be stopped at 20:00 (e.g., as part of the USER OVERRIDE ON command), CS 140 may provide the OVERRIDE OFF—ACKNOWLEDGED (20:00) command to EUT 130 when the USER OVERRIDE ON command is received, or at a later time (e.g., at 20:00). If the end user does not provide an indication ahead of time that the override will be stopped at 20:00 (e.g., the override is for an indeterminate length of time, left to the discretion of the end user), CS 140 may provide the OVERRIDE OFF—ACKNOWLEDGED (20:00) command to EUT 130 when the USER OVERRIDE OFF command is received (e.g., at 20:00).

In this example, upon acknowledging the USER OVERRIDE OFF command, CS 140 provides the following command to EUT 130: AT 20:01, START VOD ITEM 6456. If the end user provides an indication ahead of time that the override will be stopped at 20:00 (e.g., as part of the USER OVERRIDE ON command), CS 140 may provide the AT 20:01, START VOD ITEM 6456 command to EUT 130 when the USER OVERRIDE ON command is received, or at a later time (e.g., at 20:01). If the end user does not provide an indication ahead of time that the override will be stopped at 20:00 (e.g., the override is for an indeterminate length of time, left to the discretion of the end user, and the like), CS 140 may provide the AT 20:01, START VOD ITEM 6456 command to EUT 130 when the USER OVERRIDE OFF command is received and acknowledged (e.g., at 20:01).

From FIG. 5A and FIG. 5B, it is clear that the CS 140 has flexibility in both determining the content schedule for EUT 130 and providing the content presentation control information to EUT 130, as well as managing end user overrides of the content schedule. Thus, CS 140 may optimize resource usage at EUT 130 (e.g., use of content storage resources, presentation resources, and the like), optimize presentation of content to end user(s) of EUT 130 in a manner most satisfying to the end user(s), and provide various other desirable functions.

Thus, the present invention enables seamless merging of presentation of scheduled (time-dependent) content and presentation of unscheduled (time-independent) content to produce a personalized content presentation channel for the end user. The present invention provides great flexibility by scheduling cached content around live content, converting live content to cached content as needed, allowing end user override capabilities to further personalize the content presentation channel for the end user, and the like, as well as various combinations thereof.

Figure 6:
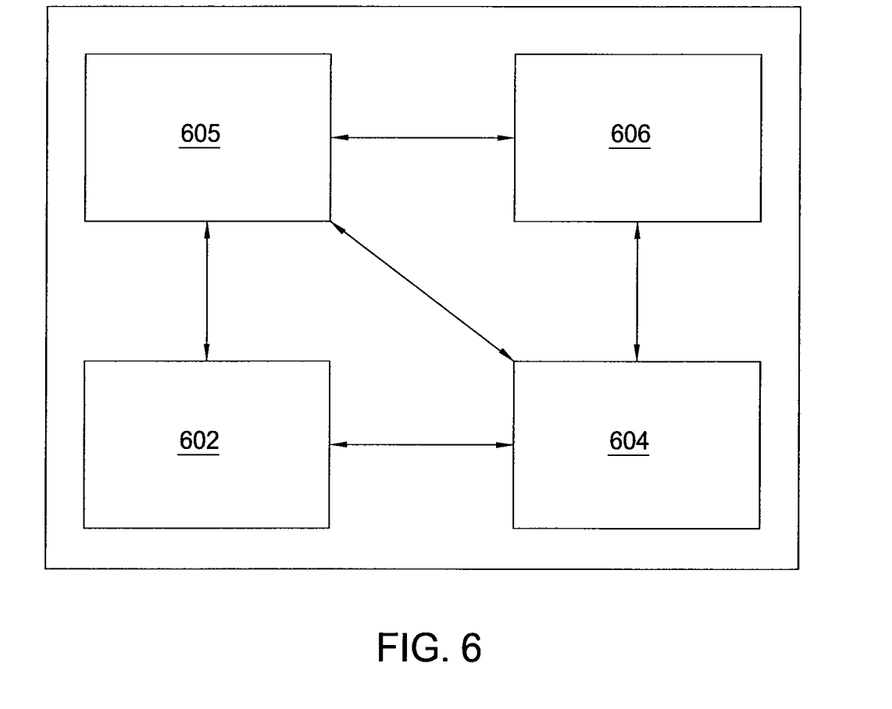
FIG. 6 depicts a high-level block diagram of a general-purpose computer suitable for use in performing the functions described herein.

FIG. 6 depicts a high-level block diagram of a general-purpose computer suitable for use in performing the functions described herein. As depicted in FIG. 6, system 600 comprises a processor element 602 (e.g., a CPU), a memory 604, e.g., random access memory (RAM) and/or read only memory (ROM), a content scheduling module 605, and various input/output devices 606 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present content scheduling process 605 can be loaded into memory 604 and executed by processor 602 to implement the functions as discussed above. As such, content scheduling process 605 (including associated data structures) of the present invention can be stored on a computer readable medium or carrier, e.g., RAM memory, magnetic or optical drive or diskette, and the like.

Although various embodiments which incorporate the teachings of the present invention have been shown and described in detail herein, those skilled in the art can readily devise many other varied embodiments that still incorporate these teachings.

What is claimed is:

1. A method, comprising:
using a processor and a memory for:
receiving information configured for use in generating a content schedule for an end user terminal, the received information associated with a set of content items available for presentation at the end user terminal, the received information comprising, for each of the content items available for presentation at the end user terminal, a respective set of content characteristics for the content item, wherein, for at least one of the content items, the respective set of content characteristics comprises a distribution mode characteristic indicative of at least one distribution mode available for distribution of the respective content item to the end user terminal and a time characteristic indicative as to whether the respective content item is time-dependent or time-independent;
generating a content schedule for the end user terminal based on the received information for use in generating the content schedule, the content schedule identifying a plurality of content items scheduled for presentation at the end user terminal, the content schedule comprising a scheduling order indicative of an order in which content items are scheduled to be presented at the end user terminal; and
determining content presentation control information based on the content schedule, the content presentation control information configured for use in controlling presentation at the end user terminal of the content items identified in the content schedule.

2. The method of claim 1, wherein the received information comprises information received from at least one of the end user terminal or a network associated with the end user terminal.

3. The method of claim 1, wherein a portion of the received information is received from a network, wherein the portion of received information comprises at least one of:
   information indicative of one or more content items previously provided to the end user terminal;
   information indicative of one or more content items currently being provided to the end user terminal; or
   information indicative of one or more content items scheduled to be provided to the end user terminal.

4. The method of claim 1, wherein a portion of the received information is received from the end user terminal, wherein the portion of received information comprises at least one of:
   information indicative of one or more content items requested by the end user via the end user terminal;
   information indicative of one or more content items selected by the network for distribution to the end user terminal;
   information indicative of one or more content items currently stored on the end user terminal;
   information indicative of one or more capabilities of the end user terminal; or
   information indicative of a current state of the end user terminal.

5. The method of claim 1, wherein the received information comprises at least one of information indicative of one or more content items requested by an end user of the end user terminal or one or more content items selected for an end user of the end user terminal based on preference information associated with the end user of the end user terminal.

6. The method of claim 1, wherein, for at least one of the content items, the respective set of content characteristics comprises at least one of:
   information indicative of a source of the content item;
   information indicative of content of the content item;
   information indicative of a start time of the content item;
   information indicative of a duration of the content item; or
   information indicative of an end time of the content item.

7. The method of claim 6, wherein the information indicative of the source of the content item comprises at least one of:
   information identifying an original source of the content item;
   information identifying a current source of the content item; or
   information indicative as to whether the content item is currently available on the end user terminal or is currently available from a network device.

8. The method of claim 6, wherein the information indicative of content of the content item comprises at least one of:
   information identifying a content type of content of the content item; or
   information identifying a level of quality of content of the content item.

9. The method of claim 1, wherein, for at least one of the content items, the respective set of content characteristics is determined based on at least one of a request of the end user terminal, one or more requests of one or more other end user terminals, electronic programming guide information, content metadata associated with the content item, or content availability information associated with the content item.

10. The method of claim 1, wherein generating the content schedule comprises at least one of:
   prioritizing a content item having a first associated content type over a content item having a second associated content type;
   prioritizing a content item having a first quality level over a content item having a second quality level, where the first quality level is greater than the second quality level;
   scheduling a first content item before a second content item based on a determination that a duration of the first content item is less than a difference between a current time and a start time of the second content item;
   scheduling a first content item before a second content item based on a determination that the first content item is being distributed via a broadcast distribution mode and that a duration of the second content item is greater than a difference between a current time and a start time of the first content item; or
   determining, based on a quality level of a content item and capability information associated with the end user terminal, whether to present the content item at the end user terminal as the content item is received at the end user terminal via a network or to present the content item at the end user terminal after the content item has been received and stored on the end user terminal.

11. The method of claim 1, further comprising:
   propagating the content presentation control information toward at least one of a network device or the end user terminal.

12. The method of claim 1, further comprising:
   representing the content presentation control information using one or more content presentation control commands; and
   propagating the one or more content presentation control commands toward at least one of a network device or the end user terminal.

13. The method of claim 1, further comprising:
   processing the content presentation control information at the end user terminal for controlling presentation of content items at the end user terminal.

14. The method of claim 1, further comprising:
   receiving a user override indicative of a change to the content schedule; and
   updating the content presentation control information based on the user override.

15. The method of claim 1, further comprising:
   receiving ones of the content items at the end user terminal.

16. The method of claim 15, further comprising:
   presenting at least a portion of the received content items at the end user terminal according to the content presentation control information.

17. The method of claim 16, wherein presentation of the received content items forms a personalized content channel.

18. The method of claim 15, further comprising:
   controlling the received content items at the end user terminal according to the content presentation control information.

19. The method of claim 18, wherein controlling the content items at the end user terminal according to the content presentation control information comprises at least one of:

receiving and storing one of the content items without presenting the one of the content items as the one of the content items is received;

receiving and presenting one of the content items without permanently storing the one of the content items for later presentation at the end user terminal;

receiving, storing, and presenting one of the content items; or retrieving one of the content items from a local storage of the end user terminal and presenting the retrieved content item.

20. The method of claim 1, wherein the method is executed by a network device or the end user terminal.

21. An apparatus, comprising:

a processor and a memory communicatively connected to the processor, the processor configured to:

receive information configured for use in generating a content schedule for an end user terminal, the received information associated with a set of content items available for presentation at the end user terminal, the received information comprising, for each of the content items available for presentation at the end user terminal, a respective set of content characteristics for the content item, wherein, for at least one of the content items, the respective set of content characteristics comprises a distribution mode characteristic indicative of at least one distribution mode available for distribution of the respective content item to the end user terminal and a time characteristic indicative as to whether the respective content item is time-dependent or time-independent;

generate a content schedule for the end user terminal based on the received information for use in generating the content schedule, the content schedule identifying a plurality of content items scheduled for presentation at the end user terminal, the content schedule comprising a scheduling order indicative of an order in which content items are scheduled to be presented at the end user terminal; and determine content presentation control information based on the content schedule, the content presentation control information configured for use in controlling presentation at the end user terminal of the content items identified in the content schedule.

22. A method, comprising:

using a processor and a memory for:

receiving information configured for use in generating a content schedule for an end user terminal, the received information comprising:

information indicative of content items requested or selected for presentation at the end user terminal, the content items comprising one or more content items available from a network and one or more content items available from the end user terminal;

for each of the one or more content items available from the network, a respective set of content characteristics comprising a distribution mode characteristic indicative of at least one distribution mode available for distribution of the respective content item to the end user terminal via the network and a time characteristic indicative as to whether the respective content item is time-dependent or time-independent;

information indicative of at least one of a capability or a state of the end user terminal;

generating a content schedule for the end user terminal based on the received information for use in generating the content schedule, the content schedule identifying a plurality of content items scheduled for presentation at the end user terminal, the content schedule comprising a scheduling order indicative of an order in which content items are scheduled to be presented at the end user terminal; and determining content presentation control information based on the content schedule, the content presentation control information configured for use in controlling presentation at the end user terminal of the content items identified in the content schedule.

\* \* \* \* \*